Sept. 12, 1944. A. D. FOSTER 2,357,817
SLOPE METER
Filed Sept. 20, 1940 2 Sheets-Sheet 1
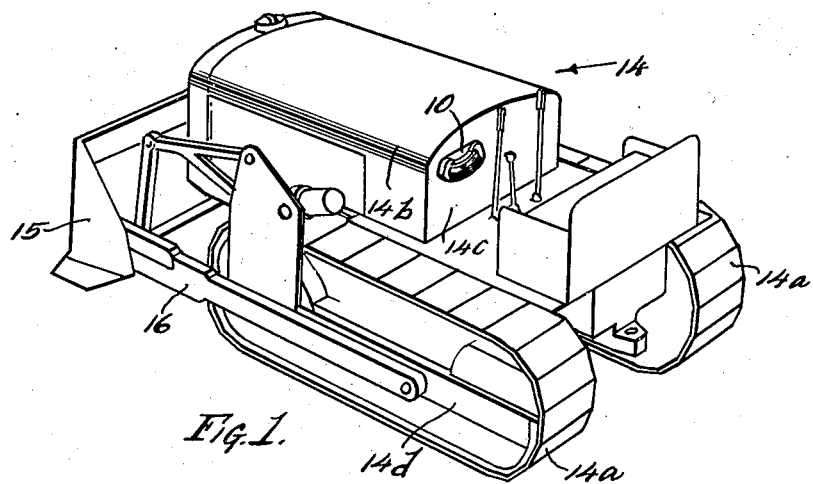
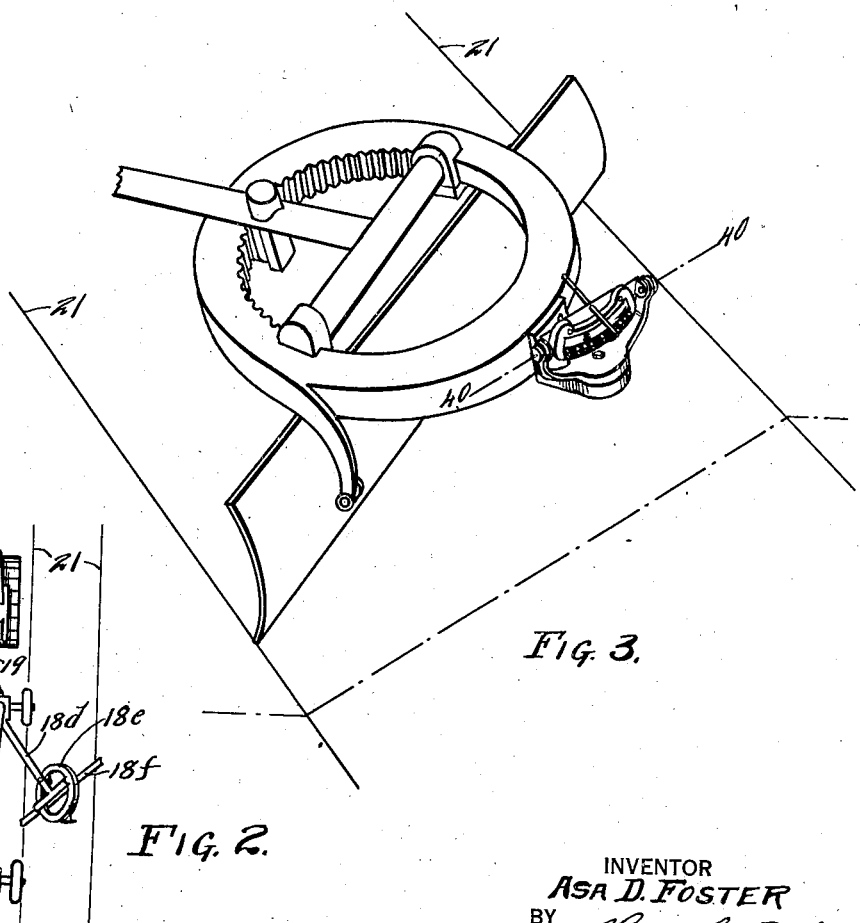
INVENTOR
ASA D. FOSTER
BY
Chas. C. Reif
ATTORNEY Sept. 12, 1944.  A. D. FOSTER  2,357,817
SLOPE METER
Filed Sept. 20, 1940   2 Sheets-Sheet 2

INVENTOR
ASA D. FOSTER
BY Chas. C. Reif.

Patented Sept. 12, 1944

2,357,817

UNITED STATES PATENT OFFICE 2,357,817

SLOPE METER

Asa D. Foster, Minneapolis, Minn.

Application September 20, 1940, Serial No. 357,545

4 Claims. (Cl. 33—206)

This invention relates to a slope meter or a device for indicating the slope of a grade. Grades are now constructed in various places and particularly in road building where a grade is often made along the side of the road. Where the road is made by a fill the bank of the road usually slopes downward at each side. These sloping banks or grades are made at various angles and various kinds of graders are used in their construction. It is customary to refer to these grades as being of a 2 to 1 or 3 to 1 slope. The first numeral indicates the horizontal distance and the second numeral indicates the vertical dimension of the slope. Thus a 1 to 1 slope would be at an angle of 45 degrees.

Heretofore there has been no ready means for determining the slope to see if it is according to specifications. The most common practice is for the contractor to build a triangular frame having the desired slope and to place this frame against the slope for a comparison. This method is slow and tedious and requires either an extra operator or that the operator of the grader stop his machine and get off to measure the grade.

It is an object of this invention to provide a simple and efficient means which may be attached to the grading machine and which will accurately indicate the slope.

It is a further object of the invention to provide a slope meter for indicating the angle of the bank or grade comprising a casing having an arcuate chamber therein containing liquid in which an object such as a ball moves, a transparent cover for said chamber, said casing having a sloping or inclined surface below said chamber on which is placed a scale indicating the slope and with which scale said ball cooperates.

It is a further object of the invention to provide such a slope meter as set forth in the preceding paragraph in which said scale has graduations thereon associated with which are numerals which indicate the slope in relation to unity, as 2 to 1, 3 to 1, etc.

It is another object of the invention to provide a slope meter comprising a casing having an arcuate chamber therein containing liquid with a ball movable in said chamber and cooperating with the scale on said casing together with a member to which said casing is secured, a frame in which said member is journaled about a horizontal axis and means for supporting and turning said frame to bring the axis of rotation of said member into a position perpendicular to the center line of the road.

It is also an object of the invention to provide such a device as set forth in the preceding paragraph together with means on said casing extending in a line perpendicular to the axis of rotation of said member to assist the operator in positioning said member.

These and other objects and advantages of the invention will be fully set forth in the following description made in connection with the accompanying drawings in which like reference characters refer to similar parts throughout the several views and in which—

Fig. 1 is a perspective view of a grading machine of the bulldozer tractor type having the invention applied thereto;

Fig. 2 is a plan view of a different type of tractor-drawn grader to which the invention may be applied;

Fig. 3 is a partial perspective view of the device shown in Fig. 2 showing the invention applied thereto;

Figure 4:
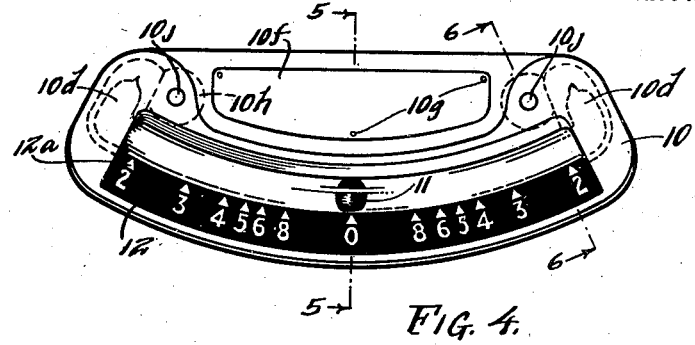
Fig. 4 is a view in front elevation of a portion of the device.
Figure 5:
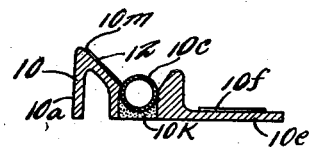
Fig. 5 is a central vertical section taken on line 5—5 of Fig. 4 as indicated by the arrows.
Figure 6:
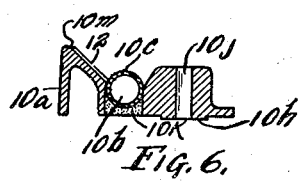
Fig. 6 is a transverse section taken on line 6—6 of Fig. 4 as indicated by the arrows.

Referring to the drawings, a device is shown comprising a casing 10. While this casing might take different forms, in the embodiment of the invention illustrated it is shown as having a convex arcuate bottom surface formed on a flange 10a. Said casing has a chamber 10b therein and while this might be variously made, in the embodiment of the invention illustrated the central portion thereof is formed by a tube 10c of glass or other transparent material. The front of casing 10b, therefore, has in effect a glass cover as the front portion of tube 10c forms the front side of chamber 10b. Casing 10 has a chamber 10d formed therein at each end with which the ends of tube 10c communicate, the chambers 10a thus forming extensions of chamber 10b. The central portion of casing 10 is as shown formed by a comparatively thin plate or flange portion 10e having a raised boss 10f on which may be secured any desired name plate by means extending through holes 10g. A boss 10h is formed on the rear side of casing 10 at each end thereof, each boss having extending therethrough a hole 10j adapted to receive bolts or other attaching means for casing 10. While chamber 10b as stated could be variously formed, in the embodiment of the invention illustrated the tube 10c is held in place by a body of material 10k which may be plaster of Paris or similar material in which tube 10c is imbedded. The chamber 10b in practice contains liquid and an object such as the ball 11 is disposed in chamber 10b in said liquid. In practice one suitable liquid has been found to be kerosene while ball 11 was made of very dark or black glass. It will be noted that the concave side of chamber 10b is uppermost and that said chamber is symmetrical about the vertical central line or axis of casing 10. Said casing 10 has a surface 10m which slopes downwardly and outwardly from adjacent the lower side of tube 10c. A scale 12 formed on a thin plate is secured to surface 10m. Scale 12 has graduations 12a thereon with which ball 11 is adapted to cooperate and said graduations have associated therewith certain numerals. In the device illustrated the central graduation is numbered zero while the other numerals occur at each side of the scale in symmetrical relation respectively. The numerals are adapted to indicate the slope or inclination of the device to the horizontal in relation to unity as 2 to 1, 3 to 1, etc. The radius about which the graduations 12a are formed is different from the radius of the arc of the surface 10a since the scale becomes somewhat distorted on the surface 10m. The scale 12 is preferably attached so that it can be easily removed and other scales substituted. In some cases it might be desirable to have the zero mark at one side of the scale.

In some types of graders the casing 10 can be attached directly as shown in Fig. 1. In Fig. 1 a tractor 14 having the endless tracks 14a is shown having also the hood 14b and a dash or instrument board 14c. A blade 15 is supported in front of the tractor and is secured by the link bars 16 to the frame 14d of the tractor. The casing 10 can be secured to the dash 14c since the inclination of the blade 15 will always be the same as the inclination of the tractor. When the blade 15 and the tractor 14 are inclined in making a slope or bank the casing 10 will be similarly inclined and the ball 11 will move to the bottom part of the chamber 10b and will register with one of the numerals on the scale 12. The driver of the tractor or bulldozer can then at once see what the grade is from the scale 12. It is thus unnecessary to go out on the slope or bank and measure it with any kind of an instrument.

In Fig. 2 another type of grading machine 18 is shown comprising a frame 18a supported upon front wheels 18b and rear wheels 18c. A bar or arm 18d is swingingly connected with the front portion of frame 18a and carries a ring 18e to the underside of which is mounted the blade 18f. Blade 18f is adapted to be rotated about the center of ring 18e and held in various positions. The grader 18 is shown as connected by the hitch 19 to a tractor 20 which draws the same along the road. The bank at the side of the road is indicated between the lines 21.

Figure 7:
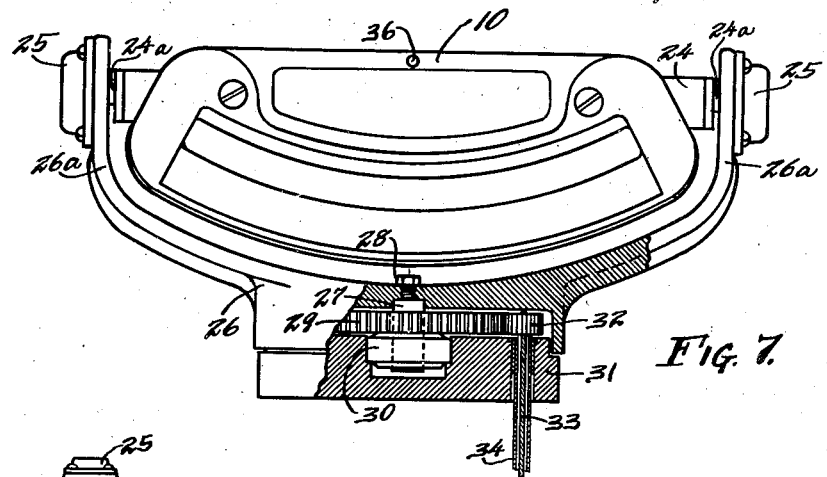
Fig. 7 is a view in front elevation showing a mounting for the casing shown in Fig. 4, some parts being broken away and others shown in vertical section.
Figure 8:
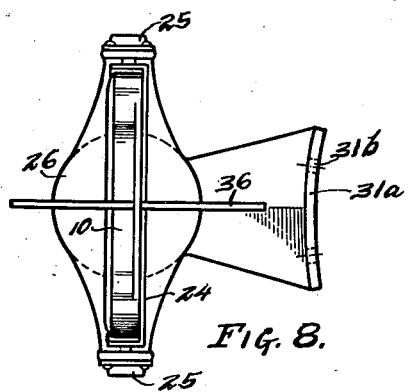
Fig. 8 is a top plan view of the device shown in Fig. 7.
Figure 9:
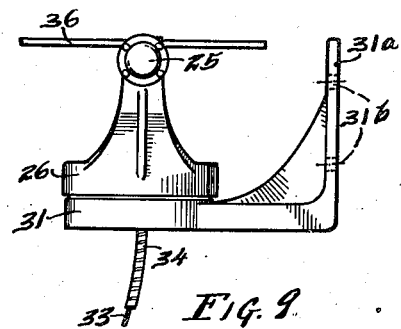
Fig. 9 is a view in end elevation of the device shown in Fig. 7, Figs. 8 and 9 being shown on a reduced scale.

For such a machine as shown in Fig. 2 the casing 10 is rigidly secured to a bar 24 as shown in Fig. 7. Bar 24 has trunnions 24a at its ends which are journaled in bearings 25 which may be of the ball bearing type and are secured to the sides of arms 26a of a yoke bracket 26. Bracket 26 extends below and is spaced from casing 10 and has a central supporting shaft 27 secured thereto by a screw 28, which shaft has secured thereto a gear 29. Shaft 27 and gear 29 are rotatably supported in a bearing 30 preferably of the ball bearing type which is carried in a supporting member 31. A pinion 32 is secured to a flexible shaft 33 and mounted for rotation in member 31. A sleeve 34 is shown as attached to member 31, said sleeve extending about and housing the flexible shaft 33. A rod 36 is secured to the flange 10e of the casing 10, the same being shown as disposed centrally thereof and as projecting at each side of casing 10 in a line perpendicular to the axis of rotation of bar 24. Member 31 is shown as extending to one side of the yoke bracket 26 and the same has a vertical flange 31a, which flange is provided with spaced holes 31b adapted to receive bolts or other members for attaching bracket 31 to the grader.

In operation the supporting bracket 31 will be attached to the ring 18e as shown in Fig. 3. The flexible shaft 33 and housing 34 will extend to within reach of the operator of the grader. It is customary to turn the blade 18f so that it does not extend perpendicular to the center line of the road or in other words it does not extend directly transversely of the slope illustrated as between the lines 21. This inclination of the blade is illustrated in Figs. 2 and 3. It will be seen that if the casing 10 extended parallel to the blade 18f it would not indicate the true slope of the bank. It is necessary to have casing 10 and bar 24 extend directly transversely of the bank or parallel to the line 40—40 shown in Fig. 3 in order that the true slope of the bank will be indicated on scale 12. When, therefore, the blade 18f is being operated at an angle to the longitudinal as shown in Figs. 2 and 3, the operator will manipulate the shaft 33 to turn bracket 26 into the position shown in Fig. 3. In this position the scale 12 will indicate the true slope of the bank. The rod 36 is provided in order to assist the operator in positioning bracket 26, bar 24 and the casing 10. The operator will have rod 36 extend longitudinally of the road or in the direction in which the tractor 20 is moving. When the operator has turned bracket 26 to the proper position the slope can be read directly from the scale 12. It will be understood that casing 10 will always be disposed in a vertical plane as it swings by gravity to such position with bar 24 as said bar rotates in its bearings 25.

From the above description it will be seen that I have provided a simple and highly efficient slope meter which can be readily attached to and used with grading machines. The slope of the grade or bank can be instantly seen at any desired time. The device will greatly facilitate the correct sloping of the bank or grade and will speed up this work. The device can be easily and quickly attached to the grading machine and when so attached needs little or no attention. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A slope meter comprising a casing having an arcuate lower surface and an arcuate chamber therein above said surface, said chamber normally being symmetrical about the center line of said casing and having its concave side uppermost, said chamber being adapted to contain liquid, an object movable in said liquid, a transparent cover for the front of said chamber, said chamber having extensions at each end of said cover extending upwardly and toward said central axis of said casing, said casing having an outwardly and downwardly sloping surface below said cover, a scale secured to said surface having graduations thereon with which said object is adapted to cooperate, numbers on said graduations indicating the slope in relation to unity as 3 to 1, etc., said casing having apertures above said chamber adjacent each end thereof for receiving means to attach it to a grading vehicle.

2. A slope meter having in combination, a casing having a chamber therein, said chamber being symmetrical about the central vertical axis of said casing, a level indicating means in said chamber, a bar to which said casing is secured extending beyond the ends thereof, a yoke frame having vertically extending arms in which the ends of said bar are journaled about a horizontal axis, a supporting member, said yoke frame extending below said casing and being revolubly supported in said supporting member about a central vertical axis, a gear secured to said yoke frame, a pinion journaled in said supporting member and meshing with said gear, said supporting frame being adapted to be attached to a sloping member of a road grader and means for rotating said pinion adapted to be operated by the operator of said grader for rotating said yoke frame to bring the axis of rotation of said bar into a position perpendicular to a line parallel to the center line of the road.

3. A slope meter having in combination, a casing having a chamber therein symmetrical about the central vertical axis of said casing, a level indicating means in said chamber movable longitudinally thereof, a scale adjacent said means adapted to be viewed directly by the operator, a member to which said casing is rigidly secured, a frame in which said member is revolubly mounted for free swinging movement by gravity about a horizontal axis extending longitudinally of said scale, a supporting member for said frame in which said frame is revolubly mounted about a central first axis perpendicular to said axis, a rod extending from the sides of said casing perpendicular to said first mentioned axis, said supporting member being adapted to be attached to a sloping member on a road grader and means adapted to be operated by the operator of said grader from his operating position for rotating said frame to bring said rod substantially parallel to the center line of the road being graded.

4. A slope meter having in combination, a casing, a gravity actuated grade indicating means in said casing, said casing having a front face on which the grade is indicated and on which it is read directly by the operator from his operating position, means in which said casing is mounted for free swinging movement about a horizontal axis extending substantially parallel to said front face, a supporting member for said means in which the latter is revolubly mounted about a central axis perpendicular to said horizontal axis, said supporting member being adapted to be attached to a sloping member on a road grader and means operable by said operator of the grader from his operating position for rotating said member to bring said horizontal axis and casing into a position at right angles to the center line of the road being graded.

ASA D. FOSTER.